May 10, 1927.  
J. JOLLEY  
1,627,607  
DRIVING AND REVERSING GEAR  
Filed June 1, 1926  3 Sheets-Sheet 1

INVENTOR.
James Jolley

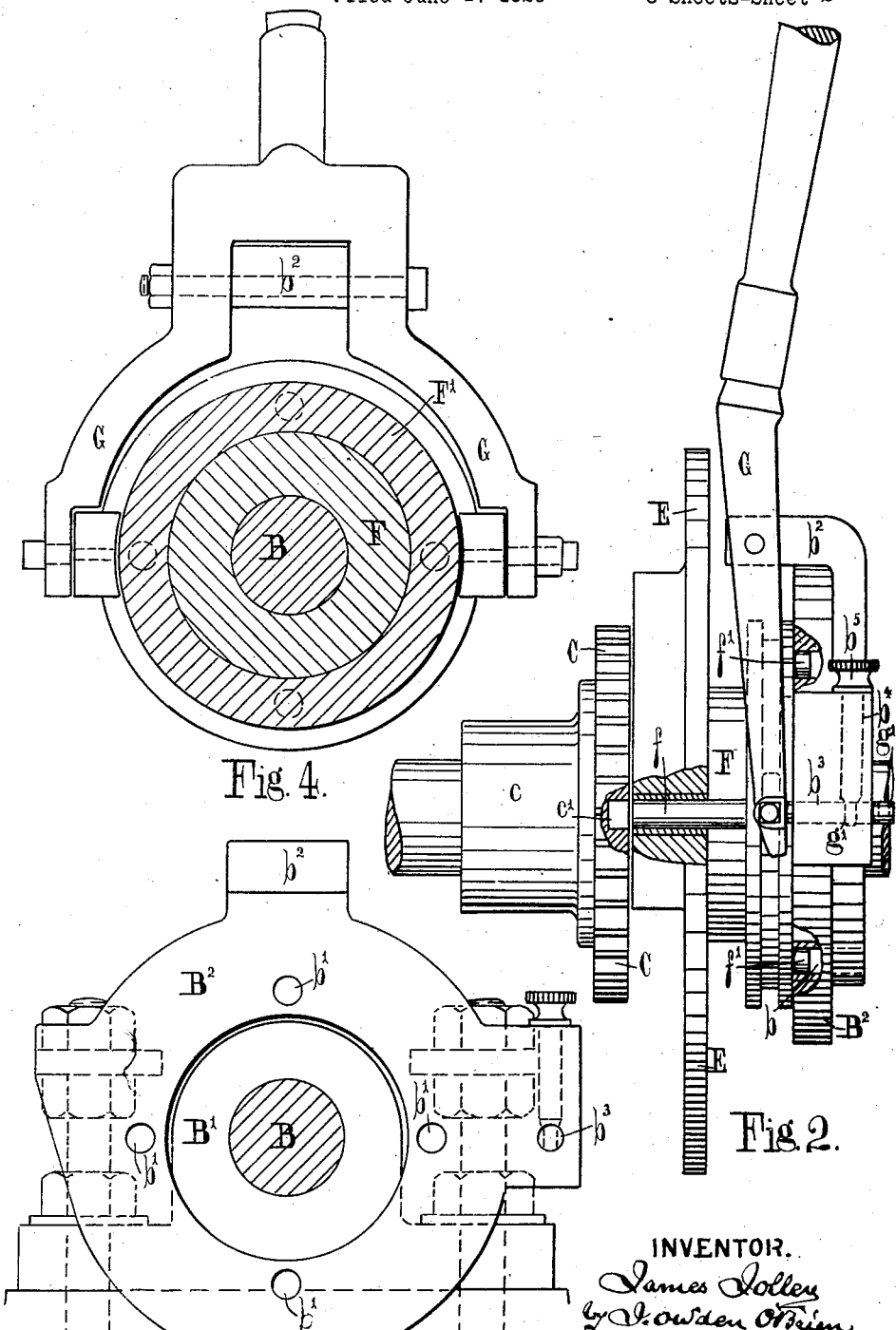

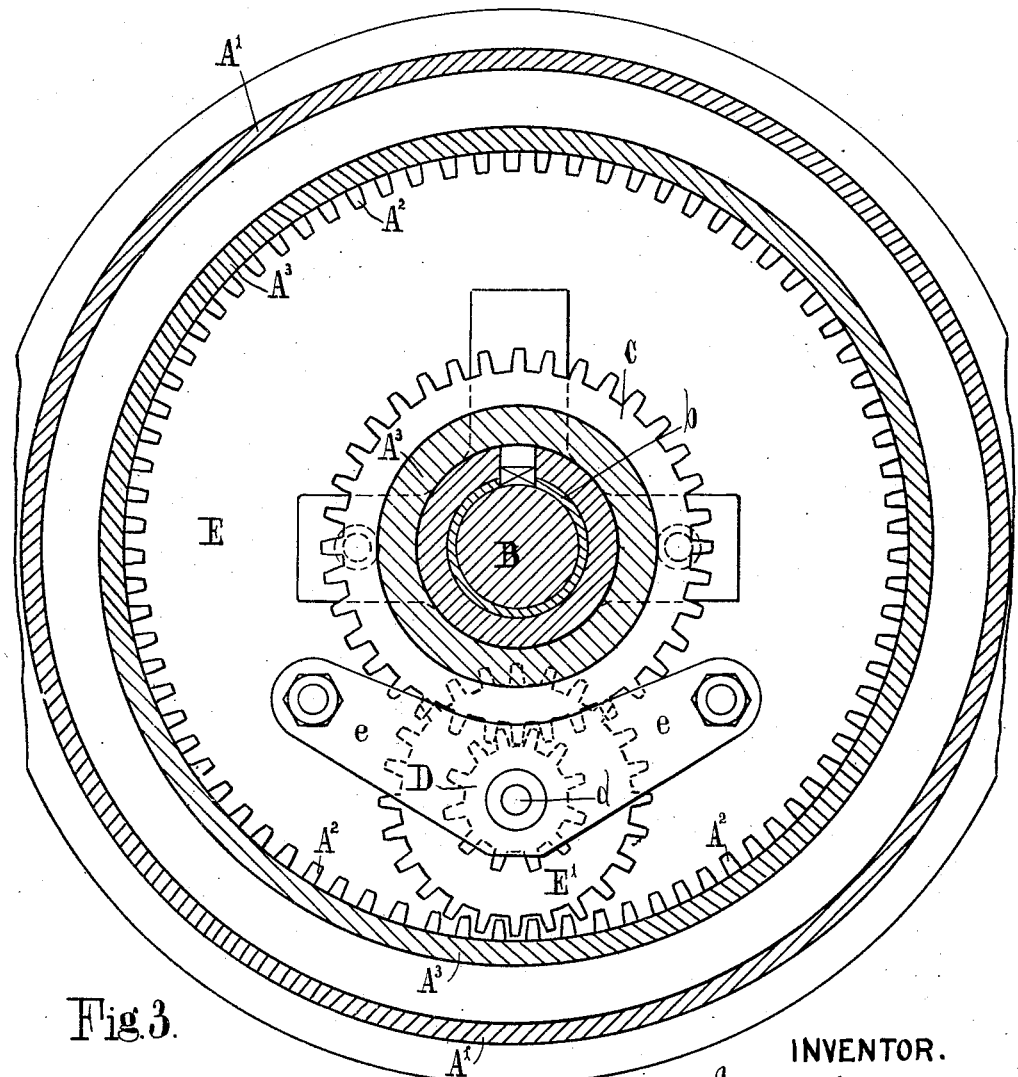

Patented May 10, 1927.

1,627,607

UNITED STATES PATENT OFFICE.

JAMES JOLLEY, OF MANCHESTER, ENGLAND.

DRIVING AND REVERSING GEAR.

Application filed June 1, 1926, Serial No. 113,091, and in Great Britain August 22, 1925.

This invention relates to improvements in reversing gear of the epicyclic type and is more particularly applicable to the fast and loose driving pulleys of carding engines.

In such reversing gear the epicyclic gear is arranged in the interior of the fast pulley, means being provided to lock the whole of the gearing and the pulley to the shaft so that the shaft will be driven in one direction, or to unlock the gearing so that the shaft will be rotated in the reverse direction.

According to the present invention a neutral position is provided between the locked and unlocked positions in which the driving pulley is free to rotate without driving the shaft in either direction thereby allowing the free rotation of the pulley to bring the necessary aperture in the gear opposite the sliding locking or unlocking members.

The invention will be described with reference to the accompanying drawings.

Fig. 2 is a similar view showing the gear in the unlocked position.

Figure 1:
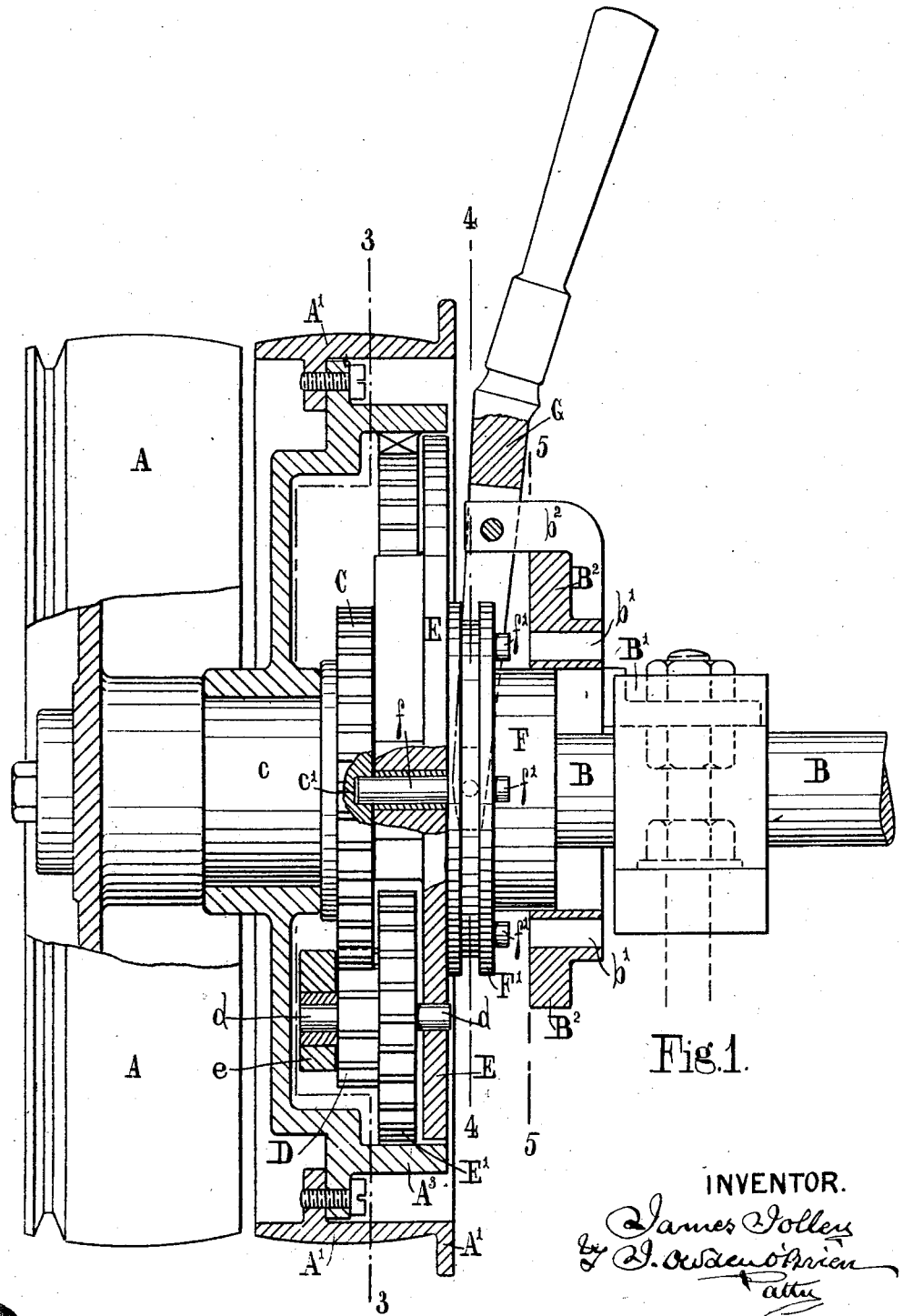
Fig. 1 is a vertical section through the pulleys, and reversing gearing showing the gear in the locked position.

Fig. 3 is a section on line 3—3 Fig. 1.
Fig. 4 is a section on line 4—4 Fig. 1.
Fig. 5 is a section on line 5—5 Fig. 1.

The fast and loose pulley comprises a loose pulley A freely mounted on a sleeve on the shaft B and a driving pulley $A^1$ loosely mounted on the boss $c$ of the sun wheel C of the epicyclic gear. The sun wheel C is keyed on to the shaft B a sleeve $b$ being disposed between the sun wheel C and the shaft B.

A planetary wheel D is mounted on a stud $d$ carried at one end in a plate E loosely mounted on the shaft B at the face of the driving pulley $A^1$ and at the other end in a bracket $e$ also carried by the plate E. The planetary wheel D is affixed to a second wheel $E^1$ also mounted on the stud $d$ which gears with an interior crown wheel $A^2$ either directly mounted on the inner periphery of the driving pulley $A^1$, or, as shown in the drawings, formed as a separate ring $A^3$ screwed or bolted to the driving pulley $A^1$. A sleeve F on which is affixed a disc $F^1$ is loosely mounted on the shaft B between the driving pulley $A^1$ and the bearing $B^1$ for the shaft.

The disc $F^1$ carries on the face near the pulley one, two or more pins $f$ passing through the loose plate E carrying the planetary wheel studs $d$, the end or ends of the pin or pins $f$ adapted to be moved into or out of an aperture or apertures $c^1$ on the sun wheel C for the purpose of locking or freeing the sun wheel to or from the loose plate E.

The other face of the disc $F^1$ is also provided with a pin or pins $f^1$ adapted to enter a corresponding hole or holes $b^1$ in the bearing $B^1$ for the shaft B or as shown in the drawing in a plate $B^2$ affixed to the bearing to lock the loose plate E and prevent it from rotating.

Thus when the pin or pins $f$ engaging with the sun wheel C are in the aperture or apertures $c^1$ therein the pin or pins $f^1$ are out of engagement with the bearing $B^1$ or plate $B^2$ affixed thereto and the whole of the gear is locked together and the pulley $A^1$ will drive the shaft B in the forward direction. On the other hand when the pin or pins $f$ are out of engagement with the sun wheel C and the pin or pins $f^1$ are in engagement with the bearing $B^1$ or the plate $B^2$ affixed thereto, the loose plate E cannot rotate and the stud $d$ on which the planetary wheels D and $E^1$ are mounted will remain stationary and the rotation of the driving pulley $A^1$ will rotate the shaft B in the opposite direction.

The pins $f$ and $f^1$ on the disc $F^1$ are so arranged that the distance between the ends of the pin or pins $f$ engaging the sun wheel C and the pin or pins $f^1$ engaging the bearing $B^1$ or plate $B^2$ affixed thereto is less than the distance between the wheel C and plate or bearing so that there is a neutral position when neither pin nor set of pins are in engagement and consequently the pulley $A^1$ is free to rotate without rotating the shaft B. This allows the free rotation of the pulley to bring the necessary apertures in the sun wheel opposite the pins when a change in direction of rotation of the shaft B is required.

The disk $F^1$ is grooved on the periphery to receive the ends of a forked lever G pivoted to an extension $b^2$ of the bearing $B^1$, the disc $F^1$ being caused to slide along the shaft by the movement of the lever G to lock and unlock the gear.

A pin $g$ projects from the forked lever G and passes through a hole $b^3$ in the bearing $B^1$ so that as the lever G is operated the pin $g$ will slide in the hole $b^3$. The pin $g$ is provided with two vertical holes $g^1$ arranged at a distance apart equal to the movement of the disc $F^1$ one or other of the holes $g^1$ coming below a vertical hole $b^4$ in the bearing $B^1$ according to the position of the disc $F^1$. A pin or pins $b^5$ is inserted in the vertical hole $b^4$ to lock the pin $g$ and prevent movement of the disc $F^1$. Instead of two holes $g^1$ being formed in the pin $g$, three holes may be formed therein, the third hole corresponding with the neutral position of the disc $F^1$.

What I claim as my invention and desire to protect by Letters Patent is:—

1. An epicyclic reversing gear for carding engines comprising a driven shaft, a bearing carrying the driven shaft, a sun wheel keyed on the driven shaft, a boss on said sun wheel, a driving pulley loosely mounted on said boss, crown teeth formed on the inner periphery of the loose pulley, a plate having holes therein loosely mounted on said driven shaft, a stud mounted on the plate, a pinion mounted on the stud and gearing with the crown teeth on the periphery of the loose pulley, a second pinion mounted on the stud and gearing with the sun wheel, a stationary plate having holes therein affixed to the bearing, a sliding disc mounted between the loose plate and the stationary plate, pins on one face thereof to enter the holes in the loose plate when the disc is in position at one end of its movement and pins on the other face thereof to enter holes in the stationary plate when the disc is in position at the other end of its movement, the distance between the ends of the pins being such that both sets of pins may be free to allow of the free rotation of the gear.

2. An epicyclic reversing gear for carding engines, comprising a driven shaft, a bearing carrying the driven shaft, a sleeve on the driven shaft, a pulley loosely mounted on the sleeve, a sun wheel keyed on the driven shaft, a boss on said sun wheel, a driving pulley loosely mounted on said boss, crown teeth formed on the inner periphery of the loose pulley, a plate having holes therein loosely mounted on said driven shaft, a stud mounted on the plate, a pinion mounted on the stud and gearing with the crown teeth on the periphery of the loose pulley, a second pinion mounted on the stud and gearing with the sun wheel, a stationary plate having holes therein affixed to the bearing, a sliding disc mounted between the loose plate and the stationary plate, pins on one face thereof to enter the holes in the loose plate when the disk is in position at one end of its movement and pins on the other face thereof to enter holes in the stationary plate when the disc is in position at the other end of its movement, the distance between the ends of the pins being such that both sets of pins may be free to allow of the free rotation of the gear, and means for locking the sliding disc in any of the positions.

In testimony whereof I have hereunto set my hand.

JAMES JOLLEY.